(12) United States Patent
Smid et al.

(10) Patent No.: US 11,885,381 B2
(45) Date of Patent: Jan. 30, 2024

(54) DUAL CLUTCH TORQUE TRANSMISSION SYSTEM WITH CONCENTRIC CLUTCHES AND COOLING FLUID SUPPLY, VEHICLE WITH THE SYSTEM AND METHOD OF COOLING THE SYSTEM

(71) Applicant: Punch Powertrain PSA e-transmissions NV, Sint-Truiden (BE)

(72) Inventors: Peter Mark Smid, Eindhoven (NL); Bert Johannes Cornelis Van Bakel, Deurne (NL); Mohammad Galab, Sint-Truiden (BE)

(73) Assignee: PUNCH POWERTRAIN PSA E-TRANSMISSIONS NV, Sint-Truiden (BE)

(*) Notice: Subject to any disclaimer, the term of this patent is extended or adjusted under 35 U.S.C. 154(b) by 0 days.

(21) Appl. No.: 17/789,272

(22) PCT Filed: Dec. 31, 2020

(86) PCT No.: PCT/EP2020/088067
§ 371 (c)(1),
(2) Date: Jun. 27, 2022

(87) PCT Pub. No.: WO2021/136824
PCT Pub. Date: Jul. 8, 2021

(65) Prior Publication Data
US 2023/0032419 A1    Feb. 2, 2023

(30) Foreign Application Priority Data
Dec. 31, 2019  (BE) .................................. 2019/6009

(51) Int. Cl.
*F16D 25/10*   (2006.01)
*F16D 25/12*   (2006.01)
*F16D 25/0638* (2006.01)

(52) U.S. Cl.
CPC .......... *F16D 25/123* (2013.01); *F16D 25/10* (2013.01); *F16D 25/0638* (2013.01)

(58) Field of Classification Search
CPC ..... F16D 25/123; F16D 25/10; F16D 25/0638
See application file for complete search history.

(56) References Cited

U.S. PATENT DOCUMENTS

| 6,059,682 A | 5/2000 | Friedmann et al. |
| 7,966,901 B2 * | 6/2011 | Metzinger ............. F16D 25/123 |
| | | 192/48.8 |

(Continued)

FOREIGN PATENT DOCUMENTS

| DE | 102005007685 A1 * | 8/2006 | ........... F16D 25/123 |
| DE | 112007002842 B4 * | 9/2013 | ............. F16D 21/06 |

(Continued)

OTHER PUBLICATIONS

International Search Report dated Feb. 5, 2021, issued in corresponding International Application No. PCT/EP2020/088067 (5 pgs.).

(Continued)

*Primary Examiner* — Stacey A Fluhart
(74) *Attorney, Agent, or Firm* — Pillsbury Winthrop Shaw Pittman, LLP

(57) ABSTRACT

Dual clutch transmission system, vehicle and method of cooling. A dual clutch transmission system, including coaxial first and second engageable and disengageable torque transmitting assemblies, configured to be installed in a power train of a vehicle, the system including a main flow path for supply of cooling fluid, wherein the main flow path branches into a first flow path for supply of cooling fluid to the first torque transmitting assembly, and a second flow path for supply of cooling fluid to the second torque transmitting assembly, wherein the system includes a third flow path for supplying cooling fluid, which is discharged from (Continued)

the second torque transmitting assembly, to the first torque transmitting assembly, the third flow path preferably being arranged within a space defined by a housing of the dual clutch transmission system.

16 Claims, 7 Drawing Sheets

(56) References Cited

U.S. PATENT DOCUMENTS

| | | | |
|---|---|---|---|
| 10,300,781 B2* | 5/2019 | Schneider | B60K 6/48 |
| 2017/0314650 A1* | 11/2017 | Jinnai | F16D 25/10 |
| 2018/0230676 A1 | 8/2018 | Akiyama et al. | |

FOREIGN PATENT DOCUMENTS

| | | |
|---|---|---|
| DE | 102015208372 A1 | 3/2016 |
| DE | 102015210071 A1 | 12/2016 |
| FR | 3090772 A1 | 6/2020 |
| JP | 2011-012736 A | 1/2011 |
| JP | 2011-052746 A | 3/2011 |

OTHER PUBLICATIONS

Written Opinion of the International Searching Authority dated Feb. 5, 2021, issued in corresponding International Application No. PCT/EP2020/088067 (6 pgs.).

* cited by examiner

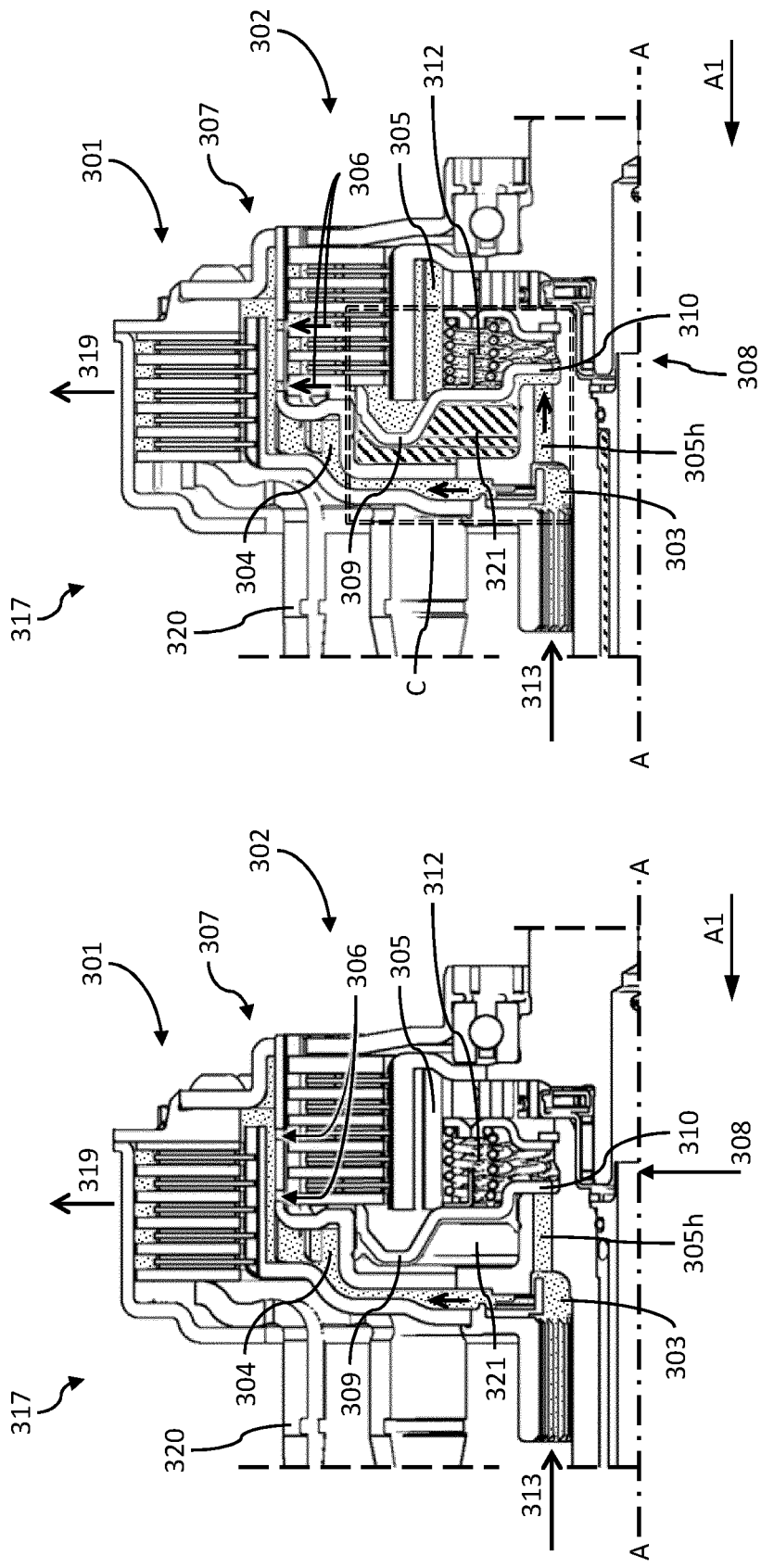

DUAL CLUTCH TORQUE TRANSMISSION SYSTEM WITH CONCENTRIC CLUTCHES AND COOLING FLUID SUPPLY, VEHICLE WITH THE SYSTEM AND METHOD OF COOLING THE SYSTEM

CROSS-REFERENCE TO RELATED APPLICATIONS

This application is the U.S. National Stage of PCT/EP2020/088067, filed Dec. 31, 2020, which claims priority to Belgium Patent Application No. 8E2019/6009, filed Dec. 31, 2019, the contents of each of which are incorporated herein by reference in their entireties.

The invention relates to a dual clutch transmission system for a vehicle and to a method of cooling at least part of a dual clutch transmission system.

Dual clutch transmission (DCT) systems are known as such for providing a transmission of torque, in particular in a vehicle. In a known DCT system, two torque transmitting assemblies, e.g. clutches, are provided. Each clutch is typically operated hydraulically, for example automatically as part of an automated transmission system. In particular, a clutch can thus be engaged and subsequently disengaged by changing (e.g. increasing, respectively decreasing), a hydraulic clutch control pressure (e.g. for controlling a clutch operating piston or other hydraulic operating member of the clutch).

One particular application of dual clutch transmission systems is in hybrid vehicles which comprise both an internal combustion engine and an electromotor. In such a context, one clutch of the system can be associated with the electromotor, the other with the combustion engine.

Torque transmitting assemblies such as clutches tend to generate heat during operation, requiring active cooling to avoid overheating and associated problems. In this respect it is known as such to provide a flow of transmission cooling fluid through such a torque transmitting assembly, wherein generated heat can be transferred to the cooling fluid which is subsequently led away from the assembly. Heat generation may be different in different clutches in the same transmission system, and the difference may vary over time.

At the same time, it is also generally desired to limit supplies of cooling fluid to clutches in view of overall efficiency and since an excess supply of fluid may negatively affect a clutch's performance. Thus, a particular challenge in transmission systems with multiple clutches, such as dual clutch transmission systems, is to appropriately regulate respective supplies of cooling fluid to respective clutches during operation, in particular in response to variable heat generation at one or each clutch. In this respect, known systems comprise complex cooling supply regulating means, wherein such complexity is known to make systems less reliable and more expensive to manufacture and maintain.

For example, U.S. Pat. No. 6,059,682 discloses a change-speed transmission in the power train of a motor vehicle, the transmission having a direct clutch and a reverse clutch, wherein at least a clutch which is engaged is cooled by a lubricant for a planetary gearing, wherein the flow of coolant to the clutches is regulated by an axially movable pressure plate of one of the clutches.

An object of the present invention is to provide an improved dual clutch transmission (DCT) system and an improved method of cooling at least part of such a system, wherein at least one of the above-mentioned problems is at least partly solved. An object is to provide a DCT system wherein cooling of respective clutches can be better regulated. An object is to provide a relatively simple design for a DCT system, in particular with a relatively small number of moving parts. An object is to provide a method of cooling clutches in a DCT system wherein a cooling of one clutch can be regulated in particular without significantly affecting a simultaneous cooling of another clutch. An object is to provide a vehicle, for example a hybrid vehicle, with an improved DCT system.

At least one or some of the above objects can be realized, at least partly, by one or more aspects of the present invention.

An aspect of the present invention provides a dual clutch transmission (DCT) system, including coaxial first and second engageable and disengageable torque transmitting assemblies, configured to be installed in a power train of a vehicle. The DCT system includes a main flow path for supply of cooling fluid. The main flow path branches into a first flow path for supply of cooling fluid to the first torque transmitting assembly, and a second flow path for supply of cooling fluid to the second torque transmitting assembly.

The DCT system further includes a third flow path for supplying cooling fluid, which is discharged from the second torque transmitting assembly, to the first torque transmitting assembly. Preferably, the third flow path is arranged within a space defined by a housing of the dual clutch transmission system (in particular such that all the cooling fluid that is discharged out of the second torque transmitting assembly can be led directly into the first torque transmitting assembly, to be discharged from the housing via that first assembly).

In such a system, the second torque transmitting assembly can be efficiently cooled by a supply of cooling fluid (the fluid in particularly being led through and/or along heat generating torque transmitting components thereof to receive heat therefrom), which cooling fluid emanates from a branched off part of a total amount of cooling fluid that enters the system (e.g. a respective housing) via said main flow path. At the same time, the first torque transmitting assembly can receive a remaining part of the total amount of supplied cooling fluid (which fluid is supplied via the first flow path through and/or along torque transmitting components of that first torque transmitting assembly, e.g. to receive heat therefrom), but still receives (preferably all) cooling fluid that is discharged from second torque transmitting assembly. Preferably, the amount of cooling fluid fed to the second torque transmitting assembly is adjustable of variable, for example between/from zero (no flow) and/to a predetermined or desired amount.

It follows that a supply of cooling fluid to the second torque transmitting assembly can be achieved (being e.g adjustable or variable) substantially without affecting a net supply of cooling fluid to the first torque transmitting assembly. Moreover, such a system can have a relatively simple design, in particular enabling appropriate cooling of two torque transmitting assemblies (e.g. at the same time) using for example a single source of cooling fluid.

It should be observed that in this application, fluid flow can be expressed in various ways, for example in a flow rate or flow amount, e.g. a fluid volume per minute (volume flow rate), fluid mass per minute (mass flow rate) or the-like, as will be appreciated by the skilled person.

According to a further embodiment, the DCT system may include a flow regulator configured to regulate the supply of cooling fluid to the second torque transmitting assembly through the second flow path, in particular relative to the supply of cooling fluid to the first torque transmitting assembly through the first flow path and/or relative to the supply of cooling fluid through the main flow path.

Such a flow regulator can provide improved, in particular variable, regulation of the supply of cooling fluid to the second torque transmitting assembly (e.g. for switching the respective fluid supply to the second torque transmitting assembly on and off).

A flow regulating state of the flow regulator may be dependent on a torque transmitting state of the second torque transmitting assembly.

In this way, for example, an increased supply of cooling fluid can be provided to the second torque transmitting assembly when the second torque transmitting assembly transmits (more) torque and thereby generates (more) heat.

In particular, during operation, the second torque transmitting assembly is either disengaged (during which supply of cooling fluid to that assembly is blocked) or the second torque transmitting assembly is transmitting torque i.e. engaged (during which the supply of cooling liquid to that assembly is not blocked).

Preferably, at least part of the flow regulator is integrated with or associated with a movable part of the second torque transmitting assembly.

Such an integration or associated can enable a relatively simple, durable, design, in particular with fewer moving parts.

Preferably, the flow regulator has a first state when the second torque transmitting assembly is in a torque transmitting engaged state, wherein the flow regulator has a second state when the second torque transmitting assembly is in a torque non-transmitting disengaged state.

In the first state, compared to the second state, the flow regulator may be configured to provide an increased supply of cooling fluid to the second torque transmitting assembly through the second flow path, at least increased with respect to the supply of cooling fluid through the first flow path and/or the main flow path.

In this way, an increased supply of cooling fluid can be provided to the second torque transmitting assembly when the second torque transmitting assembly transmits torque and thereby generates (more) heat.

In the first state, for example about 30% of the supply of cooling fluid through the main flow path can thus be supplied to the second torque transmitting assembly and/or about 70% of the supply of cooling fluid through the main flow path can thus be supplied into the first flow path. In has been found that such a configuration can provide appropriate cooling of the first and second torque transmitting assemblies. It should be noted that other ratios than the 30%-70% example are also envisaged, as is explained below.

In the second state, the flow regulator is preferably configured to substantially or totally block the supply of cooling fluid (via the second fluid path) to the second torque transmitting assembly through the second flow path. In this way, i.e. by preventing/blocking cooling of a disengaged second torque transmitting assembly (an 'open clutch') efficient use of cooling fluid is achieved, and relatively low transmission losses.

Thus, (more) cooling fluid can be supplied (more) directly to the first torque transmitting assembly, in particular when the second torque transmitting assembly generates less or substantially no heat.

The second torque transmitting assembly may be provided with a respective operating member which is (axially) movable between a coupling position in which the second torque transmitting assembly is engaged and a decoupling position in which the second torque transmitting assembly is disengaged. The operating member can in particular be a clutch piston.

The operating member of the second torque transmitting assembly may be connected to the flow regulator or can form or provide part thereof, for setting a flow regulating state of the flow regulator.

Such an operating member, e.g. piston, can advantageously enable that a state of the flow regulator is coupled to an engagement state of the second torque transmitting assembly, in particular in a simple and robust way.

A switching of an engagement state of the first torque transmitting assembly is preferably substantially independent from the position or state of the operating member of the second torque transmitting assembly.

In this way, a versatile DCT system can be provided, wherein one or more torque transmitting assemblies can be engaged and/or disengaged substantially independently from the or each other.

The movable operating member of the second torque transmitting assembly may be arranged to act as a valve member of the flow regulator, in particular providing a flow regulating section thereof, wherein said flow regulating section is movable onto and away from a valve seat that defines part of the second flow path, for closing and opening that flow path, respectively.

Such a configuration can provide a simple and robust design for the operating member and/or the flow regulator.

The valve seat may be configured for inhibiting, in particular blocking, an axial movement of the operating member in a first axial direction, upon mutual mechanical contact.

Thus, an elegant design can be provided, wherein the valve seat serves an additional purpose for the operating member. In other words, the valve seat can thus be integrated in means for advantageously preventing an excess movement of the operating member (e.g. piston) beyond the disengagement position from the engagement position.

The DCT system preferably includes spring means for moving the operating member in said first axial direction using respective spring force.

Such spring means can enable that the operating member is brought to its disengagement position and/or that the valve member is positioned onto the valve seat, in particular in the absence of a, e.g. hydraulic, actuation of the operating member.

One of the first and second torque transmitting assemblies may comprise an inner clutch, wherein the other of the first and second torque transmitting assemblies comprises an outer clutch. Preferably the second torque transmitting assembly comprises the inner clutch.

It has been found that application of the invention can be particularly advantageous with such a configuration. Alternatively, the first torque transmitting assembly may comprise the inner clutch.

The DCT system may be configured to combine the respective supplies of cooling fluid through the first flow path and the third flow path at the first torque transmitting assembly, wherein the thus combined supply of cooling fluid at the first torque transmitting assembly substantially corresponds to the supply of cooling fluid through the main flow path.

In this way, the supply of cooling fluid to the first torque transmitting assembly can be substantially independent of a variable supply of cooling fluid to the second torque transmitting assembly.

The DCT system may further comprise a source of transmission cooling fluid from which source the main flow path extends. Said source is preferably configured to regulate the flow of cooling fluid through the main flow path Such a dedicated transmission fluid source can thus provide respective supplies of cooling fluid to both the first and second torque transmitting assemblies.

Also, in an embodiment, the fluid source can be configured for circulating the cooling fluid to and from the torque transmission assemblies (e.g. to a respect joint housing of those assemblies), and e.g. for removing heat from cooling fluid (to surroundings) to cool that fluid. The skilled person will appreciated that a respective transmission fluid pump means (pump) can be associated with or be part of the system to achieve flow or circulation of the fluid.

The second torque transmitting assembly may be configured for receiving torque from an electromotor of a hybrid vehicle. For example, the DCT system may be a DCT system for a hybrid vehicle with an internal combustion engine and an electromotor.

The invention can find particular advantage in such a DCT system, wherein for example the second torque transmitting assembly is only occasionally engaged and/or wherein for example supply of cooling fluid to the second torque transmitting assembly requires less precise regulation of its supply of cooling fluid compared to the first torque transmitting assembly.

In an aspect of the invention a vehicle, for example a hybrid vehicle with an internal combustion engine and an electromotor, comprises a dual clutch transmission system according to an aspect of the invention.

Such a vehicle can provide one or more above-mentioned advantages.

It will be appreciated that the invention is not limited to hybrid vehicles since the DCT system can also be installed in vehicles having one or more electromotor drives only, or in vehicles having a combustion engine only, or differently.

An aspect of the invention provides a method of cooling at least one of a plurality of torque transmitting assemblies of a dual clutch transmission (DCT) system, for example utilizing an above-mentioned DCT system according the invention. The method comprises: supplying cooling fluid into a second of the torque transmitting assemblies (in particular for receiving heat therefrom); discharging cooling fluid (e.g. heated by the second torque transmitting assembly) from said second of the torque transmitting assemblies; and supplying cooling fluid which has been discharged from said second of the torque transmitting assemblies, preferably directly, to a first of the torque transmitting assemblies.

Such a method can provide one or more above-mentioned advantages.

The method may further comprise: regulating the supply of cooling fluid to the second of the torque transmitting assemblies relative to a simultaneous supply of cooling fluid to the first of the torque transmitting assemblies.

The regulating may comprise: engaging the second of the torque transmitting assemblies (in particular from a disengaged state), thereby substantially increasing a or the supply of cooling fluid to the second of the torque transmitting assemblies (for example from zero supply), in particular relative to the simultaneous supply of cooling fluid to the first of the torque transmitting assemblies, in particular such that a ratio P of the (increased) supply (P2) of cooling fluid to the second of the torque transmitting assemblies as a fraction of the simultaneous supply (P1) of cooling fluid to the first of the torque transmitting assemblies (P1), (P=P2:P1), is between 5:95 and 90:10, preferably between 10:90 and 75:25, more preferably between 15:85 and 60:40, more preferably between 20:80 and 50:50, more preferably between 25:75 and 40:60, for example about 40:60 or about 30:70

The regulating may comprise: disengaging the second of the torque transmitting assemblies, thereby substantially reducing, preferably substantially or totally blocking, the supply of cooling fluid to the second of the torque transmitting assemblies, in particular relative to the simultaneous supply of cooling fluid to the first of the torque transmitting assemblies (and in particular such that substantially none of the cooling fluid flows through the second torque transmitting assembly).

It will be appreciated that such engaging and disengaging of the torque transmitting assembly occur in particular at mutually different times. Thus, the disengaging may be a subsequent disengaging, in particular subsequent after the engaging, and vice versa.

The invention will be elucidated further using exemplary embodiments and drawings. The drawings are schematic. In the drawings, the same or similar elements have been provided with the same or similar reference signs. In the drawings:

FIG. 3a shows a cross section view of part of a dual clutch transmission system according to a fourth embodiment, wherein a second torque transmitting assembly is in a disengaged state;

FIG. 3b shows a corresponding cross section view of the dual clutch transmission system of FIG. 3a, wherein the second torque transmitting assembly is in an engaged state;

Figure 1B:
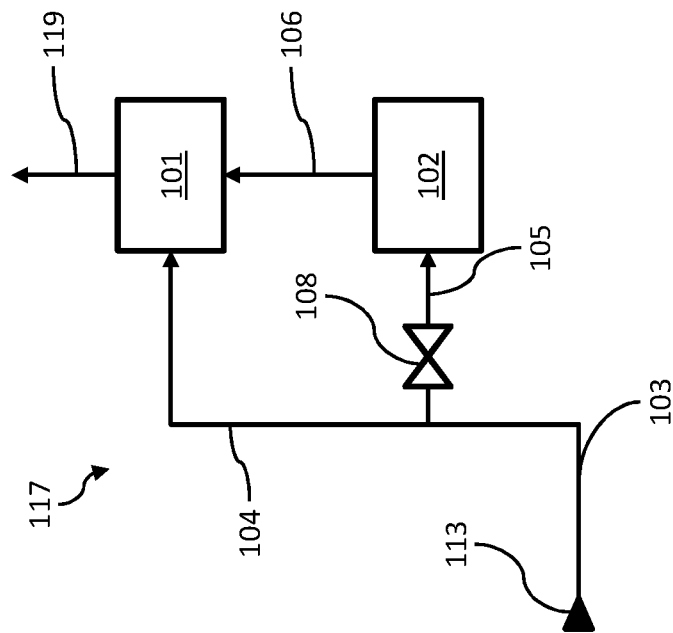
FIG. 1b shows a cooling fluid flow chart of a dual clutch transmission system according to a second embodiment.
Figure 1A:
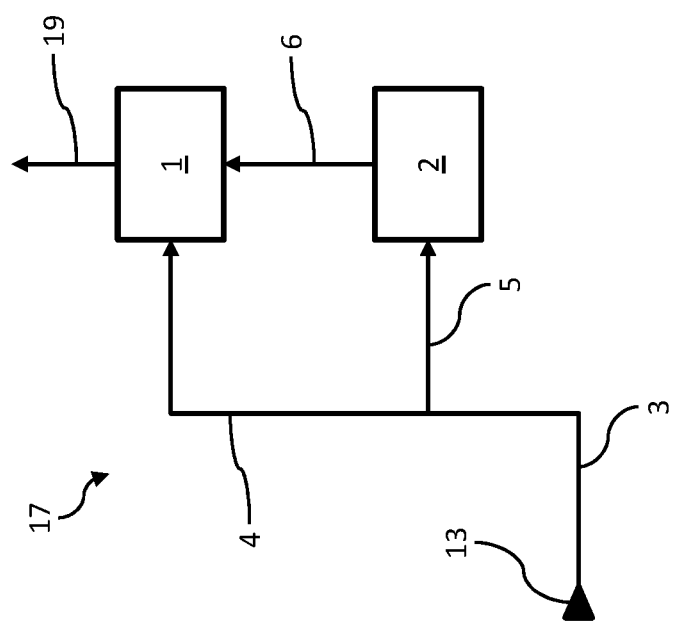
FIG. 1a shows a cooling fluid flow chart of a dual clutch transmission system according to a first embodiment.

FIGS. 1a-b, 2a-b, and 3a-b show examples of a dual clutch transmission system 17, wherein FIGS. 1a-b each show a cooling fluid flow chart of such a system.

The system 17 includes coaxial first 1 and second 2 engageable and disengageable torque transmitting assemblies, configured to be installed in a power train of a vehicle 14. Diagrams of a respective vehicle 14 are shown in FIG. 4.

A main axis A of the system 17 is shown in FIGS. 2a-b and 3a-b. It will be appreciated that in those figures, the main axis A corresponds to a line of at least substantial symmetry, wherein corresponding mirrored structures of those shown on one side of the axis A are substantially (e.g. partly) mirrored on the other side of the axis A. As such, such a cross sectional view will be familiar to and readily understood by those skilled in the art of transmission systems (see also e.g. the drawings of afore-mentioned U.S. Pat. No. 6,059,682).

The system 17 includes a main flow path 3 for supply of cooling fluid, wherein the main flow path 3 branches into a first flow path 4 for supply of cooling fluid to the first torque transmitting assembly 1, and a second flow path 5 for supply of cooling fluid to the second torque transmitting assembly 2. The system 17 includes a third flow path 6 for supplying cooling fluid, which is discharged from the second torque transmitting assembly 2, to the first torque transmitting assembly 1.

During operation, as cooling fluid is in contact with, e.g. flows through, a torque transmitting assembly 1 and/or 2 of the system 17, the cooling fluid can receive heat from the respective torque transmitting assembly 1 and/or 2. It will be appreciated that a cooling fluid can be supplied in the form of a transmission fluid, for example, wherein such a supply of transmission fluid can serve a dual purpose of both cooling and lubricating the system 17 or at least a part thereof, for example the torque transmitting assemblies 1 and 2.

The third flow path 6 is preferably arranged within a space defined by a housing 307 of the dual clutch transmission system 17. FIGS. 3*a-b* show such a housing 307 as a structure or combination of structures which substantially surrounds and/or encloses both the first 301 and second 302 torque transmitting assemblies. Preferably, such a housing 307, which is known as such in the context of transmission systems, at least partly retains (directly or indirectly) said torque transmitting assemblies 301, 302 in their respective locations.

As shown in FIGS. 3*a-b*, the housing 307, in particular a part, e.g. including one or more walls and/or shells, which adjoin and/or surround the second torque transmitting assembly 202, 302, can comprise or provide the third flow path 206, 306 in the form of one or more openings 206, 306 therein, wherein said openings 206, 306 provide (part of) a fluid connection from the second torque transmitting assembly 202, 302 towards the first torque transmitting assembly 1.

In FIGS. 3*a-b*, the housing 307 can be seen as substantially surrounding the first 301 and second 302 torque transmitting assemblies.

The first torque transmitting assembly 1 is preferably provided with an outlet means 19 for discharge of cooling fluid from the first torque transmitting assembly 1. In FIGS. 3*a-b*, the outlet means 19 is denoted by arrow 319. It will be appreciated that such outlet means 19 may be realized in various ways, at least some of which being known as such in the field of transmission systems.

In embodiments, the system 117 includes a flow regulator 108 configured to regulate the supply of cooling fluid to the second torque transmitting assembly 102 through the second flow path 105, in particular relative to the supply of cooling fluid to the first torque transmitting assembly 101 through the first flow path 104 and/or relative to the supply of cooling fluid through the main flow path 103.

FIG. 1*b* shows an exemplary flow regulator 108 in the form of a valve in the second flow path 105. It will be appreciated that such a flow regulator 108, while advantageous, is not strictly necessary to carry out the invention. For example, FIG. 1*a* shows a DCT system 17 without such a flow regulator.

In embodiments, a flow regulating state of the flow regulator 208 is dependent on a torque transmitting state of the second torque transmitting assembly 202, wherein preferably at least part of the flow regulator 208 is integrated with or associated with a movable part 209 of the second torque transmitting assembly, wherein preferably the flow regulator 208 has a first state when the second torque transmitting assembly 202 is in a torque transmitting engaged state, wherein the flow regulator 208 has a second state when the second torque transmitting assembly 202 is in a torque non-transmitting disengaged state.

Figure 2B:
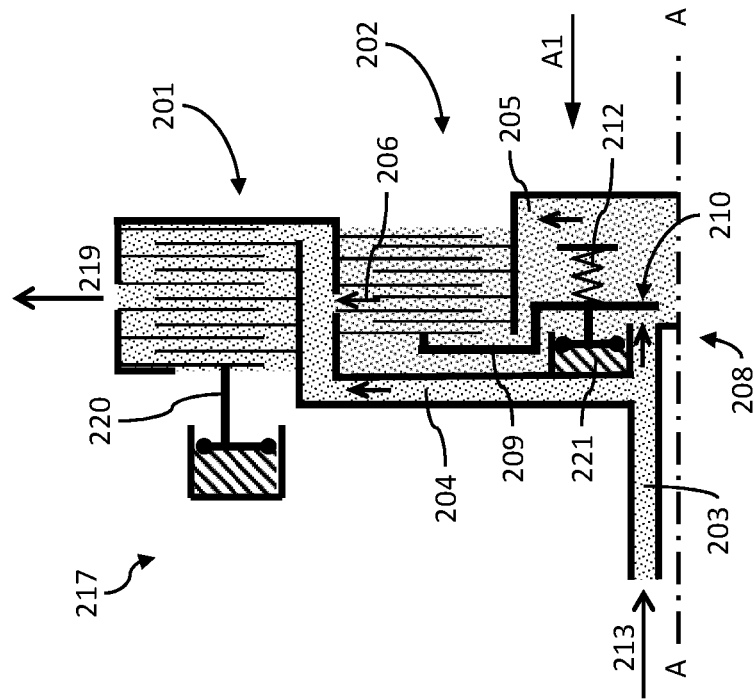
FIG. 2b shows a corresponding cross section view of the dual clutch transmission system of FIG. 2a, wherein the second torque transmitting assembly is in an engaged state.
Figure 2A:
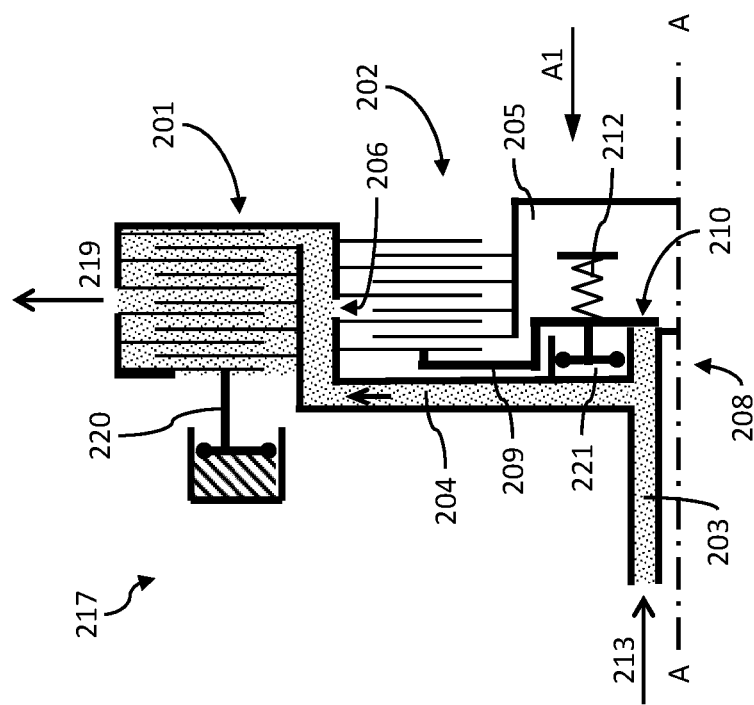
FIG. 2a shows a cross section view of part of a dual clutch transmission system according to a third embodiment, wherein a second torque transmitting assembly is in a disengaged state.
Figure 3C:
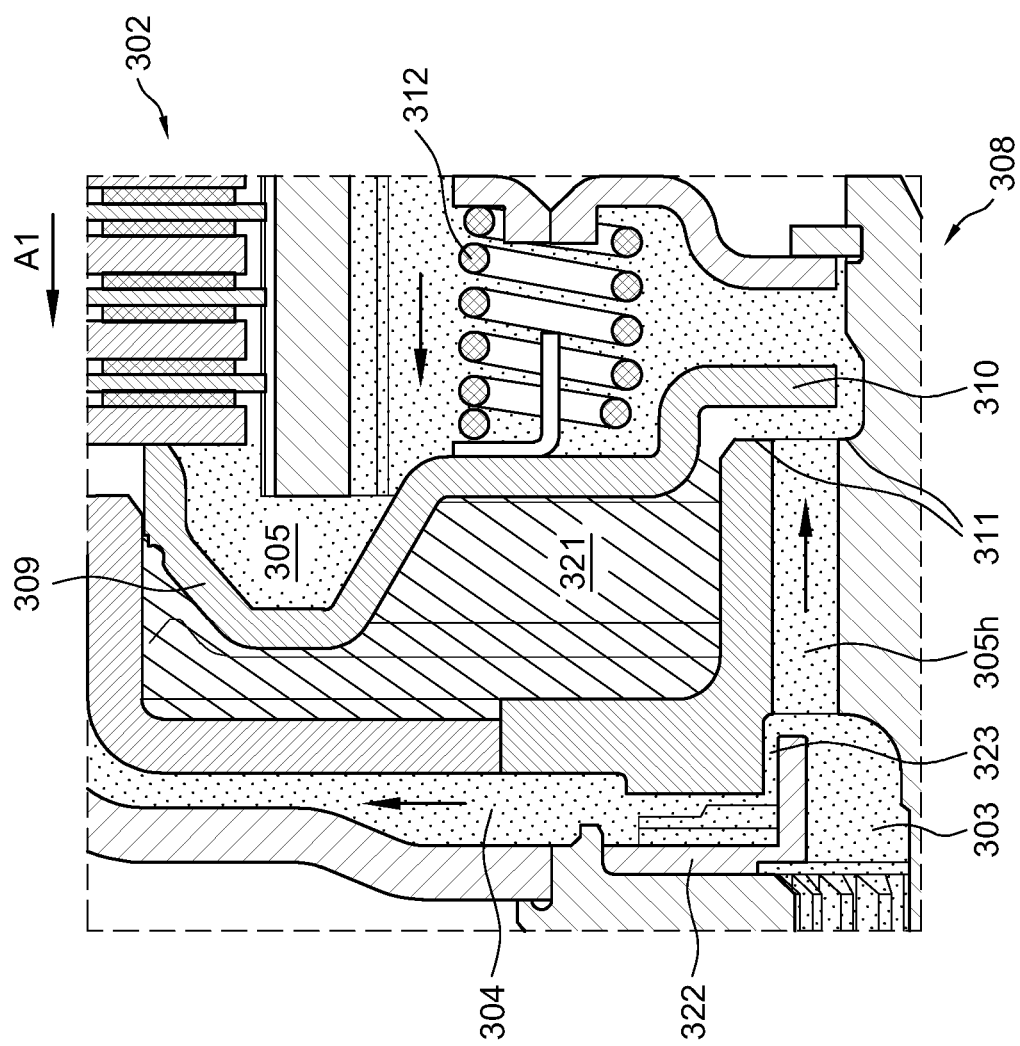
FIG. 3c shows detail C of FIG. 3b (indicated with a dashed double line in FIG. 3b)

FIGS. 2*a* and 3*a* show a DCT system 217, 317 in such a second state, while FIGS. 2*b* and 3*b* show the respective DCT system 217, 317 in such a first state (and FIG. 3*c* shows detail C of FIG. 3*b*). It can be seen in those figures that a position of movable part 209, 309 of the flow regulator 208, 308 is different in the second state compared to the first state. In particular FIGS. 3*a-b* show that in the first state (see FIG. 3*b*), compared to the second state (see FIG. 3*a*), the second torque transmitting assembly 302 is axially (more) compressed by the movable part 309.

The movable part 209 may be movable, at least from one to another of the first and second states, in particular from the second state to the first state, by an increased pressure in a respective pressure chamber 221, e.g. hydraulic pressure chamber 221, associated with the second torque transmitting assembly 202. Such a pressure chamber 221, 321 is shown in FIGS. 2*b* and 3*b* as a linearly hatched area, denoting a (more) pressurized state compared to FIGS. 2*a* and 3*b*, respectively. Thus, a position of the movable part 209, 309 may be substantially dependent on a pressurization state of the pressure chamber 221, 321.

It is further noted that the first torque transmitting assembly 201 may be provided with its own respective (independent) pressure chamber for (independently) operating a respective operating member 220 of the first torque transmitting assembly 201.

Preferably, in the first state, compared to the second state, the flow regulator 208 is configured to provide an increased supply of cooling fluid to the second torque transmitting assembly 202 through the second flow path 205, at least increased with respect to the supply of cooling fluid through the first flow path 204 and/or the main flow path 203, for example such that about 30% of the supply of cooling fluid through the main flow path 203 is thereby supplied to the second torque transmitting assembly 202 and/or such that about 70% of the supply of cooling fluid through the main flow path 203 is thereby supplied into the first flow path 204.

Preferably, in the second state (see FIGS. 2*a* and 3*a*), the flow regulator 208, 308 is configured to substantially block the supply of cooling fluid to the second torque transmitting assembly 202, 302 through the second flow path 205, 305.

In embodiments, the second torque transmitting assembly 202 is provided with a respective operating member 209, for example the movable part 209, which is (axially) movable between a coupling position in which the second torque transmitting assembly 202 is engaged and a decoupling position in which the second torque transmitting assembly 202 is disengaged, the operating member 209 in particular being a clutch piston 209.

Such an operating member 209 may be thus movable as described above with respect to the movable part 209, wherein the movable part 209 may be the operating member 209.

In embodiments, the operating member 209 of the second torque transmitting assembly 202 is connected to the flow regulator 208 or forms or provides part thereof, for setting a flow regulating state of the flow regulator 208.

Preferably a switching of an engagement state of the first torque transmitting assembly 201, for example via a respective operating member 220, is substantially independent from the position or state of the operating member 209 of the second torque transmitting assembly 202.

In embodiments, the movable operating member 209 of the second torque transmitting assembly 202 is arranged to act as a valve member 209 of the flow regulator 208, in particular providing a flow regulating section 210, 310 thereof (see FIGS. 2a-b, 3a-c), wherein said flow regulating section 310 is movable onto and away from a valve seat 311 (see FIG. 3c) that defines part of the second flow path 305, for closing and opening that flow path 305, respectively.

Thus, for example, the valve member 309 may be movable onto and away from the valve seat 311 by a respective depressurization and pressurization of the pressure chamber 321.

With reference to FIGS. 3a-c, the valve seat 311 may be arranged at a downstream end of one or more holes 305h which form part of the second flow path 305. Such holes 305h can for example extend axially through a shaft, e.g. an input shaft, of the system 317. The holes 305h are preferably substantially evenly distributed around the main axis A to promote a substantially even flow of cooling fluid. The number of holes 305h and their dimensions (in particular diameter) can be selected to affect a desired flow and/or ratio of flows of cooling fluid. In one embodiment, six such holes 305h are provided. In another embodiment, twelve such holes 305h are provided.

In embodiments, the valve seat 311 is configured for inhibiting, in particular blocking, an axial movement of the operating member 309 in a first axial direction A1, upon mutual mechanical contact, the system 317 preferably including spring means 312 for moving the operating member 309 in said first axial direction A1 using respective spring force.

FIGS. 2b and 3b show the spring means 212, 312 as being (more) compressed compared to FIGS. 2a and 3a, respectively.

The spring means 312 may be arranged in the second flow path 305, for example in a respective spring chamber which forms part of the second flow path 305, such that cooling fluid can flow through the spring means 312. FIGS. 2b and 3b-c show how in the first state (i.e. the second torque transmitting assembly 202, 302 being in an engaged torque-transmitting state), cooling fluid can thus flow through the spring means 212, 312.

A compact design can thus be realized, wherein space occupied by the spring means 212, 312 serves an additional purpose of providing a path for cooling fluid.

In embodiments, as shown for example in FIGS. 3a-b, one of the first 301 and second 302 torque transmitting assemblies comprises an inner clutch 302, wherein the other of the first 301 and second 302 torque transmitting assemblies comprises an outer clutch 301, wherein preferably the second torque transmitting assembly 302 comprises the inner clutch 302.

In embodiments, the DCT system is configured to combine the respective supplies of cooling fluid through the first flow path 4 and the third flow path 6 at the first torque transmitting assembly 1, wherein the thus combined supply of cooling fluid at the first torque transmitting assembly 1 substantially corresponds to the supply of cooling fluid through the main flow path 3.

The respective supplies may be thus combined within and/or near the first torque transmitting assembly 1. As an example, FIGS. 2b and 3b show the respective supplies as being combined just upstream of the first torque transmitting assembly 301, just downstream of the third flow path 306.

In embodiments, the DCT system further comprises a source 13 of cooling fluid from which source 13 the main flow path 3 extends, wherein said source 13 is preferably configured to regulate the flow of cooling fluid through the main flow path 3.

In FIGS. 2a-b and 3a-b, the source 213, 313 is denoted by arrow 213, 313. It will be appreciated that the source 213, 313 may be arranged at a distance, e.g. a greater distance than shown, from the first 201, 301 and/or second 202, 302 torque transmitting assemblies.

Figure 4A:
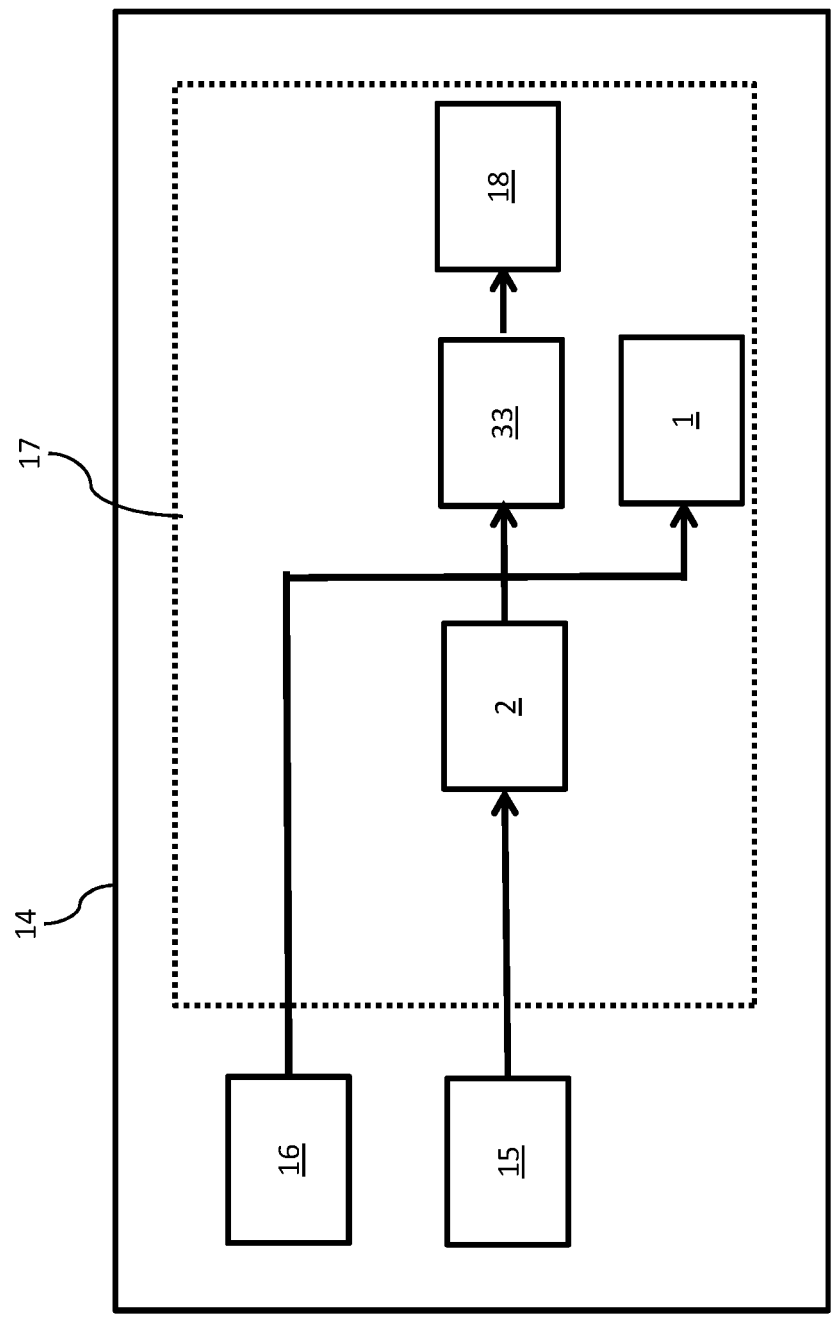
FIG. 4a, 4b shows diagrams of a vehicle, at two respective torque transmitting assembly states.
Figure 4B:
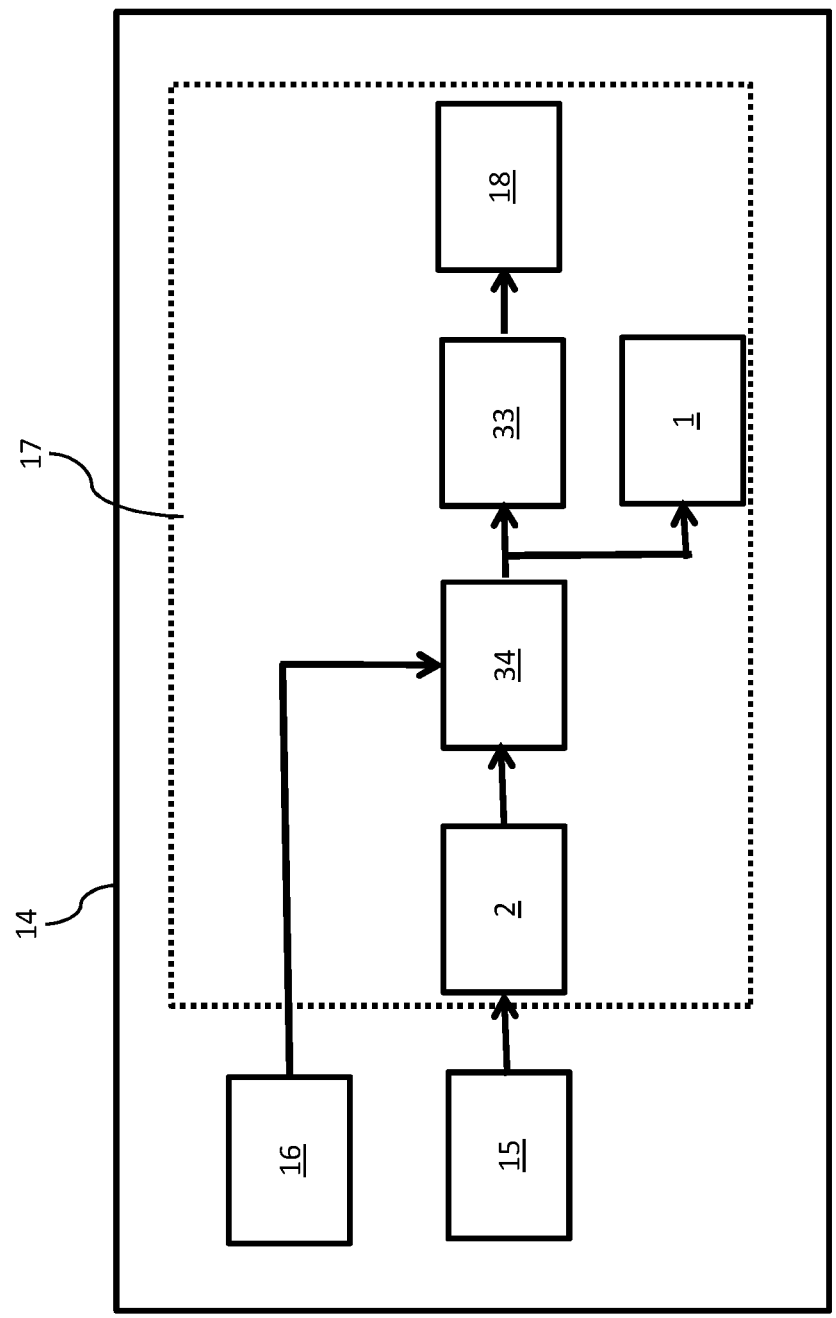

In embodiments, the DCT system further comprises a planetary gear set 18. FIG. 4a, 4b show such a planetary gear set 18 diagrammatically. Also, in embodiments, the DCT system can include a shifting/brake clutch 33, for receiving torque from the torque transmitting assemblies 1, 2.

The DCT system 17 can for example configured for a hybrid vehicle 14 with an internal combustion engine 15 and an electromotor 16. With further reference to FIG. 4a, 4b in embodiments, the second torque transmitting assembly 2 is configured for receiving torque from an internal combustion engine 15 of a e.g. a hybrid vehicle 14. The second torque transmitting assembly 2 can be connected or connectable to an optional planetary gear set 18 via a shifting/brake clutch 33 (see FIG. 4a), and input shaft 44 (see FIG. 4b), as will be appreciated by the skilled person.

FIG. 4a shows a diagram of a vehicle 14, for example a hybrid vehicle 14 with an internal combustion engine 15 and an electromotor 16, comprising the dual clutch transmission system 17. In FIG. 4a, the first torque transmitting assembly 1 is in a decoupled state.

FIG. 4b is similar to FIG. 4b, showing the vehicle when the first torque transmitting assembly 1 is in a coupled state. As a result, the electromotor 16 is coupled, via input shaft 34 (shown between the second torque transmitting assembly 2 and shifting clutch 33 in the diagram), for delivering power to the powertrain.

A method of cooling at least one of a plurality of torque transmitting assemblies 1, 2 of a dual clutch transmission system 17, for example utilizing a system 17 as described above, comprises: supplying cooling fluid into a second 2 of the torque transmitting assemblies; discharging cooling fluid from said second 2 of the torque transmitting assemblies; and supplying cooling fluid which has been discharged from said second 2 of the torque transmitting assemblies, preferably directly, to a first 1 of the torque transmitting assemblies.

In embodiments, the method further comprises: regulating the supply of cooling fluid to the second 102 of the torque transmitting assemblies relative to a simultaneous supply of cooling fluid to the first 101 of the torque transmitting assemblies.

In embodiments, the regulating comprises: engaging the second 202 of the torque transmitting assemblies, thereby substantially increasing the supply of cooling fluid to the second 202 of the torque transmitting assemblies, in particular relative to the simultaneous supply of cooling fluid to the first 201 of the torque transmitting assemblies.

Said substantially increasing is in particular such that the supply of cooling fluid to the second 202 of the torque transmitting assemblies as a fraction of the simultaneous supply of cooling fluid to the first 201 of the torque transmitting assemblies corresponds to a ratio P, wherein P is preferably between 5:95 and 90:10, e.g. preferably between 10:90 and 75:25, more preferably between 15:85 and 60:40, more preferably between 20:80 and 50:50, more preferably between 25:75 and 40:60, for example about 30:70 to about 40:60.

Figure 5B:
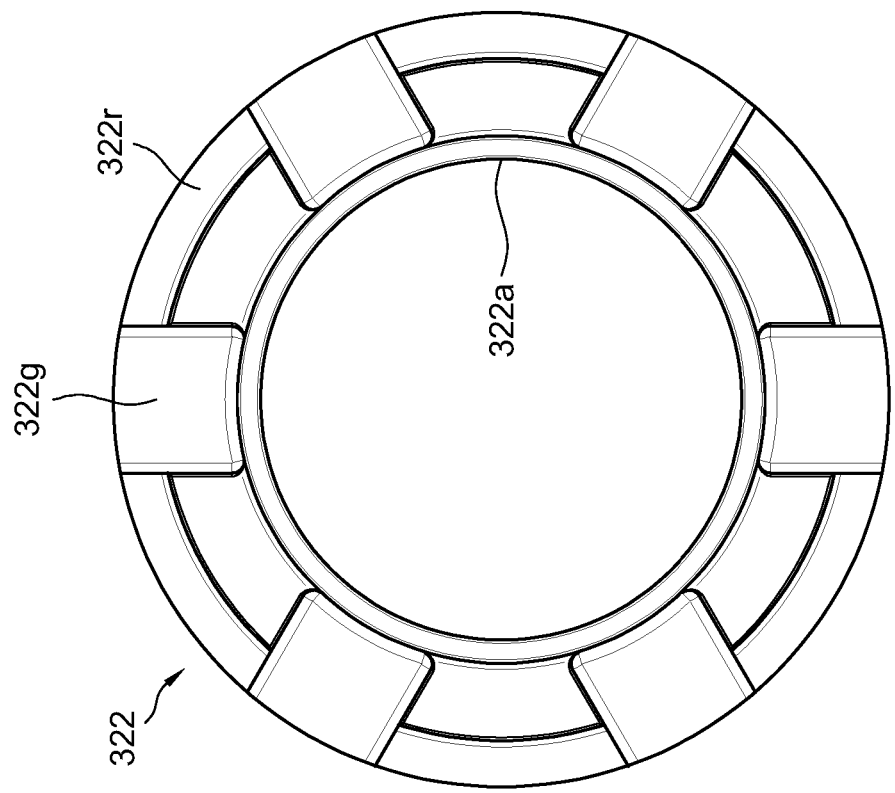
FIG. 5b shows a side view of the constriction member of FIG. 5a viewed in the first axial direction A1 (see FIGS. 3a-c).
Figure 5A:
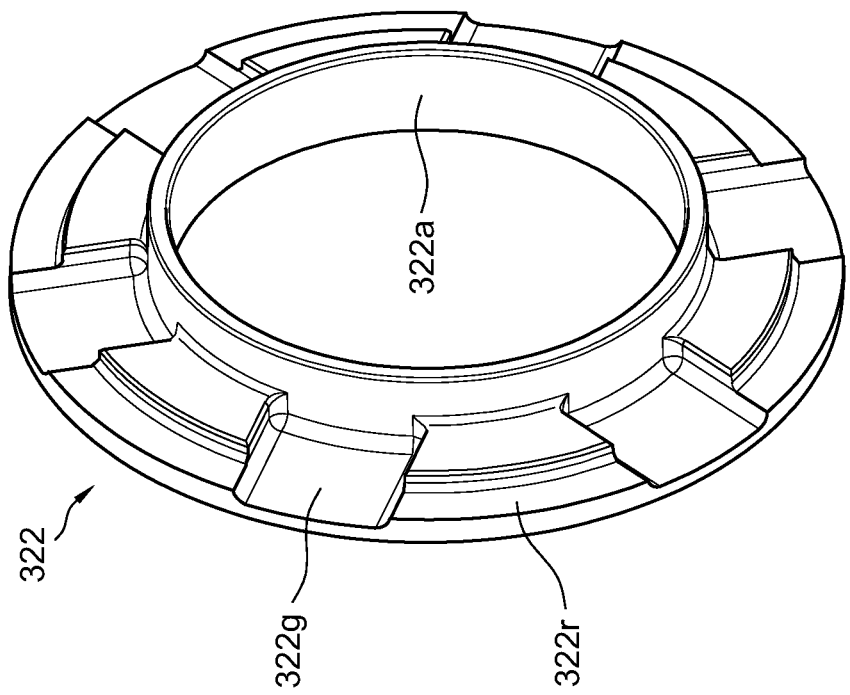
FIG. 5a shows a perspective view of a constriction member of the system of FIGS. 3a-c.

To this end, with reference to FIGS. 3c and 5a-b, the DCT system 317 may comprise a constriction member 322 which provides a constriction 323 in the first flow path 304, for example at a border between the main flow path 303 and the first flow path 304. Such a constriction member 322 can be dimensioned to effect the ratio P, thereby providing simple and effective means to select an appropriate ratio P in a DCT system. The constriction member 322 is preferably configured to provide a substantially static or constant constriction, e.g. being substantially stiff, yielding a substantially constant ratio P (at least in the state for which P is defined, i.e. wherein the second 302 of the torque transmitting assemblies is engaged). Such a configuration can be particularly simple and robust.

The constriction member 322 may have a substantially L-shaped cross section, comprising a substantially radially extending section 322r and a substantially axially extending section 322a extending from an inner radial side of the radially extending section 322r. The radially extending section 322r may be provided with a series of respective grooves 322g through which cooling fluid can flow in the first flow path 304, wherein for example the number of grooves and/or their dimensions (in particular transverse to the first flow path 304) can be selected to affect a desired constriction 323 in the first flow path 304. Alternatively or additionally, the axially extending section 322a can be provided with a series of holes (not shown) extending radially therethrough, wherein larger and/or more holes can thus provide a reduced flow constriction.

It will be appreciated that various parts of the DCT system, in particular those parts that form the first and second flow paths 304 and 305, can thus be designed to affect desired flow resistances which in turn can yield a desired ratio of cooling fluid supplies (e.g. expressed as the ratio P as explained above). As one example, the system 317, in particular the constriction member 322, may be designed to provide a clearance of 0.7 mm at the constriction 323 in the first flow path 304.

In embodiments, the regulating comprises disengaging the second 202 of the torque transmitting assemblies (in particular before and/or after the engaging), thereby substantially reducing, preferably substantially blocking, the supply of cooling fluid to the second 202 of the torque transmitting assemblies, in particular relative to the simultaneous supply of cooling fluid to the first 201 of the torque transmitting assemblies.

While the invention has been elucidated using exemplary embodiments and drawings, these are in no way to be construed as limiting the scope of the invention, which scope is provided by the claims Within that scope, many variations, combinations and extensions are possible, as will be appreciated by the skilled person. For example, a dual clutch transmission system may comprise more than two torque transmitting assemblies. Further examples are evident from the description and drawings.

The invention claimed is:

1. A dual clutch transmission system, including coaxial first and second torque transmitting assemblies that are engageable and disengageable, configured to be installed in a power train of a vehicle, the system including a main flow path for supply of cooling fluid,
wherein the main flow path branches into a first flow path for supply of cooling fluid to the first torque transmitting assembly, and a second flow path for supply of cooling fluid to the second torque transmitting assembly,
wherein the system includes a third flow path for supplying cooling fluid, which is discharged from the second torque transmitting assembly, to the first torque transmitting assembly, the third flow path being arranged within a space defined by a housing of the dual clutch transmission system,
wherein the system includes a flow regulator configured to regulate the supply of cooling fluid to the second torque transmitting assembly through the second flow path,
wherein at least part of the flow regulator is integrated with or associated with a movable operating member of the second torque transmitting assembly, and wherein the movable operating member of the second torque transmitting assembly is arranged to act as a valve member of the flow regulator providing a flow regulating section thereof, wherein said flow regulating section is movable onto and away from a valve seat that defines part of the second flow path, for closing and opening that flow path, respectively.

2. The system according to claim 1,
wherein the regulation of the supply of cooling fluid to the second torque transmitting assembly is a regulation relative to the supply of cooling fluid to the first torque transmitting assembly through the first flow path and/or relative to the supply of cooling fluid through the main flow path.

3. The system according to claim 2, wherein a flow regulating state of the flow regulator is dependent on a torque transmitting state of the second torque transmitting assembly.

4. The system according to claim 3, wherein the flow regulator has a first state when the second torque transmitting assembly is in a torque transmitting engaged state, wherein the flow regulator has a second state when the second torque transmitting assembly is in a torque non-transmitting disengaged state,
wherein in the first state, compared to the second state, the flow regulator is configured to provide an increased supply of cooling fluid to the second torque transmitting assembly through the second flow path, at least increased with respect to the supply of cooling fluid through the first flow path and/or the main flow path, such that about 30% of the supply of cooling fluid through the main flow path is thereby supplied to the second torque transmitting assembly and/or such that about 70% of the supply of cooling fluid through the main flow path is thereby supplied into the first flow path,
wherein in the second state, the flow regulator is configured to substantially block the supply of cooling fluid to the second torque transmitting assembly through the second flow path.

5. The system according to claim 1, wherein the operating member is axially movable between a coupling position in which the second torque transmitting assembly is engaged and a decoupling position in which the second torque transmitting assembly is disengaged, the operating member in particular being a clutch piston,
wherein the operating member of the second torque transmitting assembly is connected to the flow regulator or forms or provides part thereof, for setting a flow regulating state of the flow regulator.

6. The system according to claim 5, wherein a switching of an engagement state of the first torque transmitting assembly is substantially independent from the position or state of the operating member of the second torque transmitting assembly.

7. The system according to claim 1, wherein the valve seat is configured for blocking, an axial movement of the operating member in a first axial direction, upon mutual mechanical contact, the system including spring means for moving the operating member in said first axial direction using respective spring force.

8. The system according to claim 1, wherein one of the first and second torque transmitting assemblies comprises an inner clutch, wherein the other of the first and second torque transmitting assemblies comprises an outer clutch,
wherein the second torque transmitting assembly comprises the inner clutch.

9. The system according to claim 1, configured to combine the respective supplies of cooling fluid through the first flow path and the third flow path at or near the first torque transmitting assembly, wherein the thus combined supply of cooling fluid corresponds to the supply of cooling fluid to the first torque transmitting assembly.

10. The system according to claim 1, further comprising a source of cooling fluid from which source the main flow path extends.

11. The system according to claim 10, wherein said source is configured to regulate the flow of cooling fluid through the main flow path.

12. A hybrid vehicle comprising the system of claim 1, the hybrid vehicle comprising an internal combustion engine and an electromotor-wherein the second torque transmitting assembly is configured for receiving torque from the electromotor.

13. A method of cooling at least one of a plurality of torque transmitting assemblies of the dual clutch transmission system according to claim 1, the method comprising:
supplying cooling fluid into the second torque transmitting assembly;
discharging cooling fluid from said second torque transmitting assembly; and
supplying cooling fluid which has been discharged from said second torque transmitting assembly directly to the first torque transmitting assembly.

14. The method according to claim 13, further comprising:
regulating the supply of cooling fluid to the second torque transmitting assembly relative to a simultaneous supply of cooling fluid to the first torque transmitting assembly.

15. The method according to claim 14, wherein the regulating comprises: engaging the second torque transmitting assembly, thereby substantially increasing the supply of cooling fluid to the second torque transmitting assembly relative to the simultaneous supply of cooling fluid to the first torque transmitting assembly such that a ratio of the supply of cooling fluid to the second torque transmitting assembly to the simultaneous supply of cooling fluid to the first torque transmitting assembly is between 5:95 and 90:10.

16. The method according to claim 15, wherein the regulating further comprises:
disengaging the second torque transmitting assembly, thereby substantially reducing and/or substantially blocking the supply of cooling fluid to the second torque transmitting assembly relative to the simultaneous supply of cooling fluid to the first torque transmitting assembly.

* * * * *